J. S. HOGELAND.
POTATO DIGGER.
APPLICATION FILED JULY 21, 1909.
958,250.
Patented May 17, 1910.
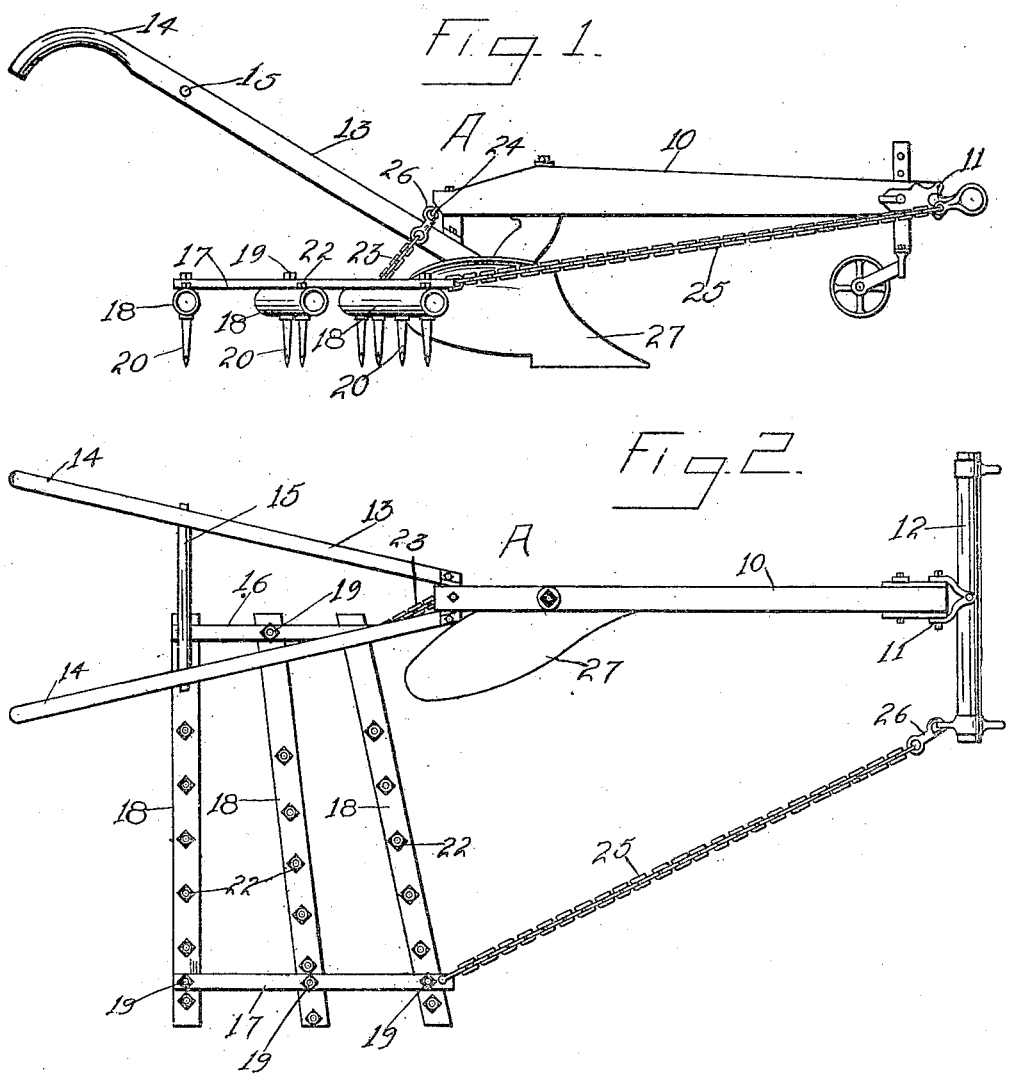
Inventor
JASON S. HOGELAND.
Witnesses
By 
Attorneys.

UNITED STATES PATENT OFFICE.

JASON S. HOGELAND, OF HOLLAND, PENNSYLVANIA.

POTATO-DIGGER.

958,250. Specification of Letters Patent. Patented May 17, 1910.

Application filed July 21, 1909. Serial No. 508,793.

*To all whom it may concern:*

Be it known that I, JASON S. HOGELAND, a citizen of the United States, residing at Holland, in the county of Bucks, State of Pennsylvania, have invented certain new and useful Improvements in Potato-Diggers; and I do hereby declare the following to be a full, clear, and exact description of the invention, such as will enable others skilled in the art to which it appertains to make and use the same.

This invention relates to agricultural implements and has special reference to an attachment for walking plows in the nature of a potato digger.

One object of the invention is to provide an attachment of this character of the harrow type which may be attached to a walking plow to separate potatoes dug up by the plow from the adhering dirt, said attachment being so arranged as not to interfere with the plowman.

Another object of the invention is to so arrange the attachment that the freshly turned potatoes will receive relatively severe treatment by the harrow while the potatoes previously turned will receive relatively mild treatment.

With the above and other objects in view the invention consists in general of a harrow-like attachment for a plow so arranged as not to interfere with the plowman and also so arranged as to give the freshly turned potatoes more severe treatment than those turned in the previous furrows.

The invention further consists in certain novel details of construction and combinations of parts hereinafter fully described, illustrated in the accompanying drawings, and specifically set forth in the claim.

In the accompanying drawings, like characters of reference indicate like parts in the several views, and Figure 1 is a side elevation of a plow equipped with this attachment. Fig. 2 is a top plan view thereof.

The letter A indicates in general a walking plow and this walking plow is provided with the usual beam 10 whereon is secured a clevis 11. In the clevis 11 is carried a swingle tree 12. The plow is provided with the ordinary stilts 13 having handles 14 at their rear extremities and being provided with the usual cross brace 15.

The attachment comprises a harrow frame provided with an inner end member 16 of relatively short length and an outer end member 17 of relatively great length. Connecting the members 16 and 17 are transverse members 18 which are preferably in the form of pipes and are secured to the end members by means of bolts 19. These transverse members are attached to the inner and outer members at evenly spaced distances, the distances at the respective ends being substantially proportional to the lengths of the end members. In the present instance three transverse members are shown and the outer member is preferably made about twenty inches in length and the inner member about fourteen, so that the spaces between the inner ends of the transverse members equal seven inches while the spaces between the outer ends of these transverse members equal ten inches. These transverse members have attached thereto a series of harrow teeth 20 each of which is provided with a stem which passes vertically through its respective member 18 and is provided at its upper end with a nut 22 for the purpose of holding the same securely on said member. These harrow teeth 20 are furthermore disposed in staggered relation on their respective members as can clearly be seen by reference to Fig. 2.

To the inner end of the harrow at the forward end of the inner member is attached a flexible element here shown as a chain 23 and the free end of this element is attached to the rear end of the plow beam as at 24. To the forward end of the other end member 17 is attached a similar flexible element also indicated in the present showing as a chain 25. The forward end of this element is connected to the end of the swingle tree 12 which lies on the same side of the beam 10 as the harrow. The connections to the swingle tree and the beam are preferably made by means of snap hooks 26. The chains 23 and 25 are of such length and so proportioned as to hold the rear transverse member 18 at right angles to the plow beam 10 and at the same time to hold this rear member in advance of the plow handles 14 so that a person walking between the plow stilts will not strike his feet against the attachment.

It will be noted that as the earth is turned by the share, here indicated at 27, the potatoes which are removed with the turned earth will be acted on very quickly by the teeth 20 which lie close together at the inner end of the transverse members 18. It will also be noted that after one furrow has been turned by the plow the same potatoes will be acted on by the teeth at the outer ends of the members 18 but that owing to the manner in which these outer ends are spaced apart the action will not be as violent.

There has thus been provided a simple and efficient device of the kind described and for the purpose specified.

Having thus described the invention, what is claimed as new, is:—

The combination with a plow, of a potato digger attachment comprising a harrow frame provided with an inner end member of relatively short length, an outer end member of relatively great length, transverse members having their inner ends attached to said inner member at evenly spaced distances and their outer ends attached to the outer member at evenly spaced distances, said distances at each end being substantially proportional to the lengths of the respective end members, a flexible element connecting the inner member to the plow beam, and a second flexible element connecting the outer member to an end of the swingle tree, said elements being of such respective length as to hold the rear transverse member perpendicular to the beam and in advance of the handles of the plow.

In testimony whereof, I affix my signature, in presence of two witnesses.

JASON S. HOGELAND.

Witnesses:
 AMOS L. MARKLEY,
 CHAS. C. HOGELAND.